(12) United States Patent
Okamoto et al.

(10) Patent No.: US 7,584,988 B2
(45) Date of Patent: Sep. 8, 2009

(54) COLLISION OBJECT PROTECTION DEVICE

(75) Inventors: Yutaka Okamoto, Wako (JP); Yuji Kikuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 388 days.

(21) Appl. No.: 11/560,080

(22) Filed: Nov. 15, 2006

(65) Prior Publication Data
US 2007/0114090 A1 May 24, 2007

(30) Foreign Application Priority Data
Nov. 18, 2005 (JP) ............................ 2005-333491

(51) Int. Cl.
*B60R 21/34* (2006.01)
(52) U.S. Cl. ................. 280/730.1; 180/274; 296/187.04
(58) Field of Classification Search ................ 180/274; 280/728.1, 729, 730.1, 743.1, 743.2; 296/187.04; B60R 21/34
See application file for complete search history.

(56) References Cited

U.S. PATENT DOCUMENTS

| | | | | |
|---|---|---|---|---|
| 6,467,563 | B1 * | 10/2002 | Ryan et al. | 180/274 |
| 6,474,679 | B2 * | 11/2002 | Miyasaka et al. | 280/730.1 |
| 6,712,169 | B2 * | 3/2004 | Ryan et al. | 180/274 |
| 6,923,286 | B2 * | 8/2005 | Sato et al. | 180/274 |
| 6,988,578 | B2 * | 1/2006 | Kikuchi et al. | 180/274 |
| 7,172,048 | B2 * | 2/2007 | Hamada et al. | 180/274 |
| 7,287,618 | B2 * | 10/2007 | Okamoto et al. | 180/274 |
| 2003/0121710 | A1 * | 7/2003 | Hamada et al. | 180/274 |
| 2003/0178239 | A1 * | 9/2003 | Takimoto | 180/274 |
| 2004/0074688 | A1 * | 4/2004 | Hashimoto et al. | 180/271 |
| 2004/0232663 | A1 * | 11/2004 | Takimoto | 280/730.1 |
| 2005/0098372 | A1 * | 5/2005 | Takimoto | 180/274 |
| 2006/0151228 | A1 * | 7/2006 | Kalliske et al. | 180/274 |
| 2007/0023223 | A1 * | 2/2007 | Okamoto et al. | 180/274 |
| 2009/0014988 | A1 * | 1/2009 | Takimoto et al. | 280/730.1 |
| 2009/0120708 | A1 * | 5/2009 | Takimoto | 180/274 |

FOREIGN PATENT DOCUMENTS

| | | | |
|---|---|---|---|
| DE | 10059223 A1 * | 7/2002 | |
| DE | 10059224 A1 * | 7/2002 | |
| DE | 10102597 A1 * | 9/2002 | |
| EP | 1270344 A2 * | 1/2003 | |
| FR | 2832966 A1 * | 6/2003 | |

(Continued)

*Primary Examiner*—Lesley D Morris
*Assistant Examiner*—Laura Freedman
(74) *Attorney, Agent, or Firm*—Rankin, Hill & Clark LLP

(57) ABSTRACT

A collision object protection device inflates and expands an air bag on a vehicle as soon as a collision of a collision object with the vehicle is detected or predicted. The collision object protection device includes: the air bag having a main body portion that expands along a lower part of a front windshield glass of the vehicle, a pair of pillar portions that expand along front pillars of the vehicle, and a pair of pillar base portions that connect the main body portion and the pair of pillar portions; and at least one inflator for supplying a gas to the main body portion of the air bag. A partition wall having one or more openings is arranged inside the air bag respectively at a boundary between the main body portion and the pillar base portion.

4 Claims, 7 Drawing Sheets

FOREIGN PATENT DOCUMENTS

| | | | |
|---|---|---|---|
| FR | 2832967 A1 | * | 6/2003 |
| JP | 07108903 A | * | 4/1995 |
| JP | 07156749 A | * | 6/1995 |
| JP | 2000-264146 | | 9/2000 |
| JP | 2004-299517 | | 10/2004 |
| WO | WO 02/079009 A1 | * | 10/2002 |
| WO | WO 2005023605 A1 | * | 3/2005 |

* cited by examiner

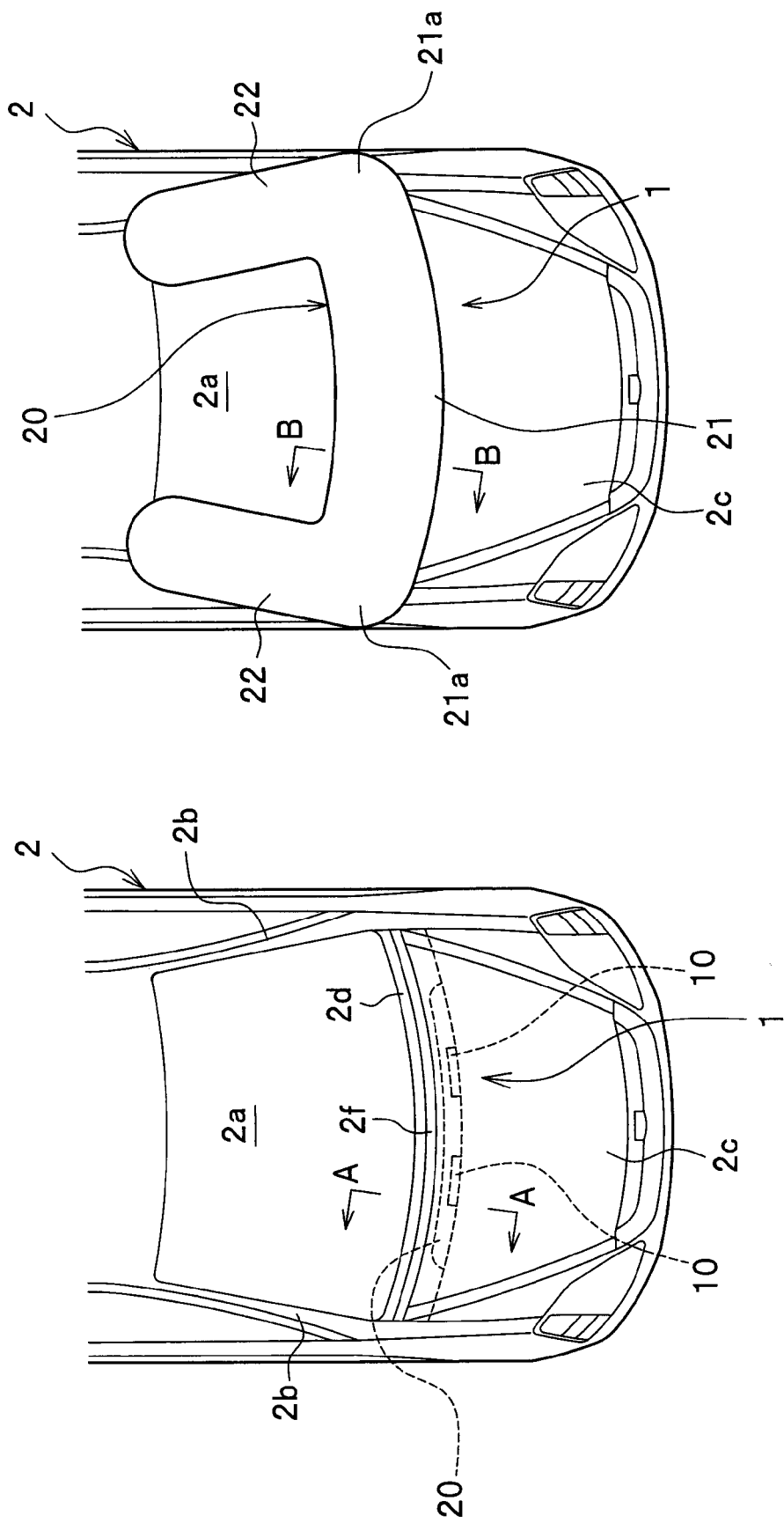

COLLISION OBJECT PROTECTION DEVICE

CROSS REFERENCE TO RELATED APPLICATIONS

This application claims the foreign priority benefit under Title 35, United States Code, §119(a)-(d) of Japanese Patent Application No. 2005-333491 filed on Nov. 18, 2005 in the Japan Patent Office, the disclosure of which is herein incorporated by reference in its entirety.

BACKGROUND OF THE INVENTION

The present invention relates to a collision object protection device, which absorbs an impact of a collision object such as a pedestrian upon collision with a vehicle, and protects the collision object.

Recently, there has been proposed a collision object protection device which inflates and expands an air bag on a vehicle if a collision of the collision object with the vehicle is detected or predicted, so that an impact force applied to the collision object is absorbed and relieved. Such a collision object protection device is disclosed, for example, by Japanese Laid-open Patent Application No. 2000-264146 (paragraph [0015] and FIG. 4), and includes an air bag substantially in the form of a letter "U" consisting of a main body portion which covers a lower part of the front windshield glass of the vehicle, a pair of pillar base portions formed on both sides of the main body portion, and a pair of pillar portions which expand from the respective pillar base portions and cover both right and left side portions (front pillars, etc.) of the front windshield glass. The air bag is compactly housed in a space below and at the center of the lower part of the front windshield glass with the respective pillar portions folded up where necessary and with the right and left ends of the main body portion folded back to the center. The air bag is inflated and expanded when an inflator supplies a gas to the main body portion of the air bag. The air bag is fixed to the vehicle such that a portion near the center of the main body portion is attached to the inflator.

However, in the conventional collision object protection device, when the inflator injects the gas into the main body portion of the air bag which is folded back and housed to inflate and expand the air bag on the front windshield glass of the vehicle, the pillar base portions or the pillar portions often expand before the main body portion sufficiently expands. As a result, flapping causes on a part of the pillar portion during the expansion of the air bag. This leads to a difficulty in stably positioning the air bag to a predetermined position.

Further, the gas is injected from the inflator near the center of the main body portion, so that flows of the gas toward the both side portions of the main body portion lift up the pillar base portions in a direction away from the vehicle body. Therefore, the pillar portions extending from the pillar base portions rise up from the vehicle body during the expansion of the air bag. Due to this state, if the air bag is subject to a crosswind or the like, the air bag is disadvantageously moved off from the predetermined position.

In other words, according to the conventional collision object protection device, it is not possible for the inflated and expanded air bag to stably cover the intended protection area. In view of the above, the present invention seeks to provide a collision object protection device which enables the inflated and expanded air bag to stably cover the intended protection area.

SUMMARY OF THE INVENTION

It is a first aspect of the present invention to provide a collision object protection device, which inflates and expands an air bag on a vehicle as soon as a collision of a collision object with the vehicle is detected or predicted, the collision object protection device comprising: the air bag consisting of a main body portion which expands along a lower part of a front windshield glass of the vehicle, a pair of pillar portions which expand along front pillars of the vehicle, and a pair of pillar base portions which connect the main body portion and the pair of pillar portions; and at least one inflator for supplying a gas to the main body portion of the air bag. A partition wall having one or more openings is arranged inside the air bag respectively at boundaries between the main body portion and the pillar base portions or at boundaries between the pillar base portions and the pillar portions.

According to this collision object protection device, a flow of the gas from the main body portion is allowed only through the opening(s) formed in the partition wall. In the case in which the partition wall is arranged respectively at the boundaries between the main body portion and the pillar base portions, the expansion of the pillar base portions is delayed more than the expansion of the main body portion. Also, in the case in which the partition wall is arranged respectively at the boundaries between the pillar base portions and the pillar portions, the expansion of the pillar portions is delayed more than the expansion of the pillar base portions.

In this collision object protection device, after the main body portion expands to have a sufficient rigidity (stiffness), the pillar base portions and the pillar portions expand. Alternatively, after the main body portion and the pillar base portions expand to have a sufficient rigidity (stiffness), the pillar portions expand. Therefore, since the pillar portions expand after the main body portion has a sufficient rigidity, it is possible to prevent flapping of the pillar portions during the expansion of the air bag.

In the case in which the partition wall is arranged at boundaries between the main body portion and the pillar base portions, the pillar base portions expand after the main body portion has a sufficient rigidity. This can prevent the pillar base portions from leaping from the vehicle body. As a result, it is possible to prevent the pillar portions from rising up from the vehicle body during the expansion of the air bag, which can prevent the air bag from being disadvantageously moved off from the predetermined position due to a crosswind or the like.

It is a second aspect of the present invention to provide a collision object protection device, which inflates and expands an air bag on a vehicle as soon as a collision of a collision object with the vehicle is detected or predicted, the collision object protection device comprising: the air bag consisting of a main body portion which expands along a lower part of a front windshield glass of the vehicle, a pair of pillar portions which expand along front pillars of the vehicle, and a pair of pillar base portions which connect the main body portion and the pair of pillar portions; and a pair of inflators to which the main body portion of the air bag is attached to supply a gas to the main body portion, wherein the main body portion is provided with a gather between the inflators.

According to this collision object protection device, since the main body portion is provided with a gather between the inflators, when the inflators supply the gas to the main body portion of the air bag, the air bag expands in the upward and downward directions at positions between the two inflators in accordance with the gather and accumulates pressure. Thereafter, from the portion at which the air bag expands in the upward direction flows the gas toward each pillar base portion in the diagonally downward direction. This flow of the gas urges the pillar base portion in the downward direction.

In the aforementioned collision object protection device, a partition wall having one or more openings may be arranged inside the air bag respectively at boundaries between the pillar base portions and the pillar portions.

According to this collision object protection device, the expansion of the pillar portions is delayed relative to than the expansions of the main body portion and the pillar base portions. Therefore, the pillar portions expand after the main body portion and the pillar base portions expand to have a sufficient rigidity (stiffness). This can prevent flapping of the pillar portions during the expansion of the air bag.

In the above collision object protection device according to the second aspect of the invention, the pillar base portions can be urged in the downward direction due to the flow of the gas directed to the diagonally downward direction, and so leaping of the pillar base portion from the vehicle body can be prevented. As a result, it is possible to prevent the pillar portions from rising up from the vehicle body during the expansion of the air bag, which can reliably prevent the air bag from being disadvantageously moved off from the predetermined position due to a crosswind or the like.

Further, in the above collision object protection device, the main body portion expands in the upward and downward directions during the expansion of the air bag so that the flatness of the air bag surface can be ensured over a wide range of area. This can reliably prevent the air bag from being disadvantageously moved off from the predetermined position.

It is a third aspect of the present invention to provide a collision object protection device, which inflates and expands an air bag on a vehicle as soon as a collision of a collision object with the vehicle is detected or predicted, the collision object protection device comprising: the air bag consisting of a main body portion which expands along a lower part of a front windshield glass of the vehicle, a pair of pillar portions which expand along front pillars of the vehicle, and a pair of pillar base portions which connect the main body portion and the pair of pillar portions; and at least one inflator to which the main body portion of the air bag is attached to supply a gas to the main body portion, wherein a plurality of partition walls each having one or more openings are arranged inside the air bag respectively across the pillar portions.

According to this collision object protection device, a plurality of partition walls each having one or more openings are arranged inside the air bag at an area where each pillar portion extends. Therefore, the expansion of the pillar portion is delayed further at the distal end of the pillar portion than at the proximal end of the pillar portion. In other words, the pillar portion gradually expands from the proximal end to the distal end in the order of the areas divided by the partition walls.

According to this collision object protection device, the pillar portions expand after the main body portion and the pillar base portions expand to have a sufficient rigidity (stiffness). This can prevent flapping of the pillar portions during the expansion of the air bag.

Further, since each pillar portion expands gradually in the order from the proximal end to the distal end, it is possible to reliably prevent flapping of the pillar portions during the expansion of the air bag.

In the aforementioned collision object protection devices according to the first to third aspects of the invention, a vent hole for discharging the gas is provided at each pillar portion in such a position that the gas is discharged oppositely to the vehicle.

According to these collision object protection devices, when the air bag discharges the gas from the vent holes in the direction opposite to the vehicle body, the flows of the gas urge the pillar portions toward the vehicle body. Therefore, flapping of the pillar portions can be more reliably prevented, which enables the air bag to more stably cover the intended protection area.

Other features and advantages of the present invention will be apparent from the following description.

BRIEF DESCRIPTION OF THE DRAWINGS

The aspects of the present invention will become more apparent by describing in detail illustrative, non-limiting embodiments thereof with reference to the accompanying drawings, in which:

FIG. 1A is a top view of a collision object protection device according to a first embodiment of the present invention, in which an air bag is not inflated;

FIG. 1B is a top view of the collision object protection device shown in FIG. 1A, in which the air bag has been inflated and expanded;

FIGS. 3A through 3E show the manner of folding the air bag, in which FIG. 3A is an explanatory view showing a step for rolling up a pillar portion to make a roll, FIG. 3B is an explanatory view showing a step for folding up a pillar base portion in a bellows fashion, FIG. 3C is an explanatory view showing a step for folding up an upper center of the main body portion in a bellows fashion, FIG. 3D is an explanatory view showing a step for fixing a part where the upper center of the main body portion has been folded up into bellows by using tape, and FIG. 3E is an explanatory view for moving the both ends of the main body portion toward the center;

DESCRIPTION OF THE PREFERRED EMBODIMENTS

First Embodiment

Figure 2A:
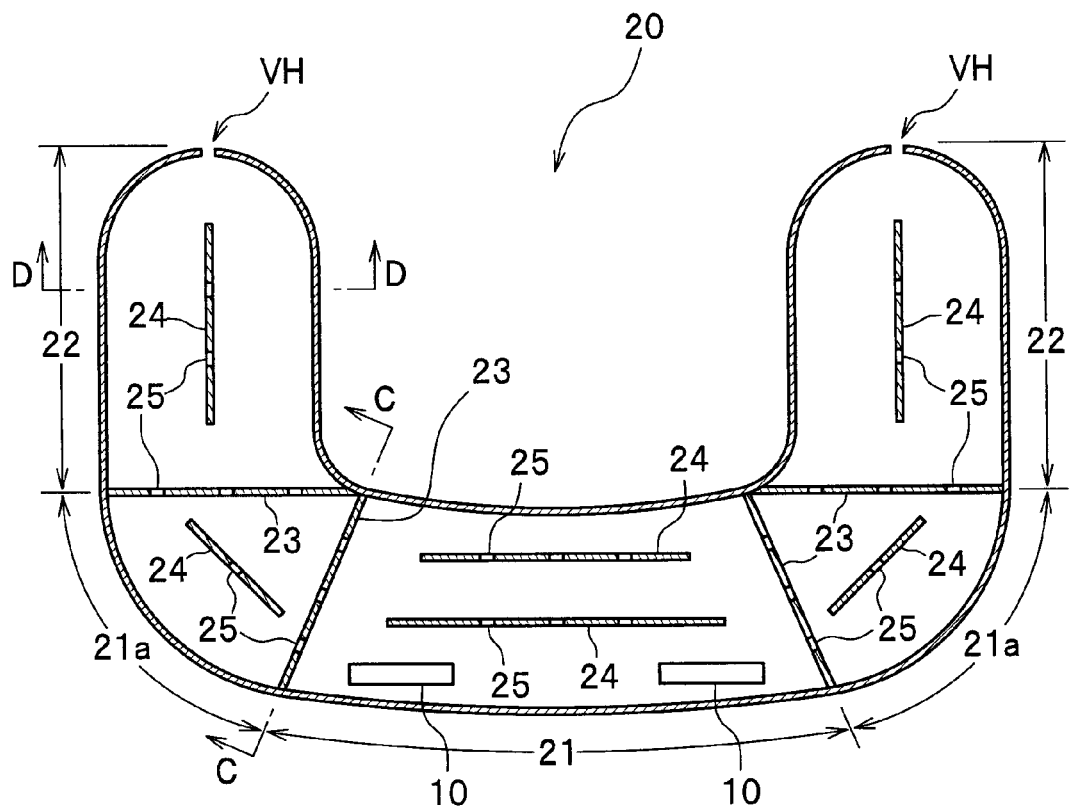
FIG. 2A is a schematic view showing the inside of the air bag that has been inflated and expanded.

A collision object protection device according to a first embodiment of the present invention will be described in detail with reference to the accompanying drawings.

As shown in FIGS. 1A and 1B, the collision object protection device 1 mainly includes a collision detection device (not shown) which detects or predicts a collision of a vehicle 2 with a collision object (not shown) such as a pedestrian, two inflators 10, 10 which generate a gas as soon as the collision detection device detects or predicts a collision of the vehicle 2 with a collision object, and an air bag 20 which is inflated and expanded on the vehicle 2 by the gas generated by the inflators 10, 10.

The collision detection device includes an ECU (Electronic Control Unit) which detects or predicts a collision of the vehicle 2 with a collision object based on a signal from a sensor (not shown) or radar (not shown) mounted on the vehicle 2. The collision detection device operates two inflators 10, 10 so as to generate the gas and to inflate and expand the air bag 20 as soon as it detects or predicts a collision of the vehicle 2 with a collision object. The collision detection device is configured using a known device, and the configuration thereof is not limited to a specific one.

Each of the inflators 10, 10 detonates an explosive based on the collision detection signal or collision prediction signal from the collision detection device so that a large amount of gas is instantly supplied to the air bag 20 (main body portion 21). According to this embodiment, a pair of inflators 10, 10 are attached to a dashboard upper (not shown) near a center of the vehicle 2.

The air bag 20 is a bag member having a tubular cross section and the shape of which is substantially in the form of a letter "U" as seen from the top. The air bag includes a main body portion (also referred to as a windshield portion) 21, a pair of pillar portions 22, and a pair of pillar base portions 21a. For convenience of reference in the following description, having considered the air bag 20 which has been inflated and expanded, the longitudinal direction of the main body portion 21 is referred to as a horizontal direction, whereas the longitudinal (extension) direction of the pillar portions 22, 22 is referred to as a vertical direction.

The main body portion 21 is a part which expands along a lower part of the front windshield glass 2a and in the direction of the width of the vehicle 2. The pillar portions 22, 22 are parts which expand along the front pillars 2b of the vehicle 2. The pillar base portions 21a, 21a are arranged to connect the main body portion 21 and the pillar portions 22, 22. The pillar base portions extend and bent from the end of the main body portion 21 to the pillar portions. The air bag 20 is fixed to the vehicle 2 (vehicle body) such that a portion near the center of the main body portion 21 is attached to the inflators 10, 10.

As shown in FIG. 2A, first tethers 23, 23 and second tethers 24, 24 are arranged inside the air bag 20. The first tether corresponds to a partition wall having one or more openings.

Figure 2B:
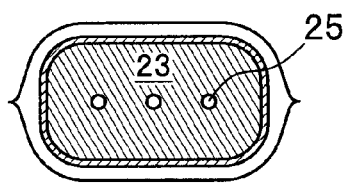
FIG. 2B is a sectional view taken along the line C-C of FIG. 2A.

The first tethers 23 are partition walls arranged inside and across the air bag 20. The first tethers 23 are arranged respectively at boundaries between the main body portion 21 and the pillar base portions 21a, 21a and at boundaries between the pillar base portions 21a, 21a and the pillar portions 22, 22. As shown in FIG. 2B, each first tether 23 has openings 25 for flowing the gas that is supplied by the inflators 10, 10 (see FIG. 2A).

Figure 2C:
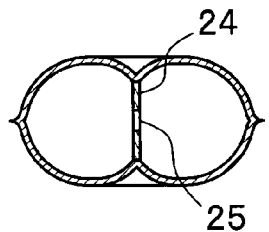
FIG. 2C is a sectional view taken along the line D-D of FIG. 2A.

The second tethers 24 are partition walls arranged in the main body portion 21, the pillar base portions 21a, 21a and the pillar portions 22, 22, respectively. The second tethers 24 are arranged along the directions in which the main body portion 21, the pillar base portions 21a, 21a and the pillar portions 22, 22 extend. In this embodiment, one second tether 24 is arranged respectively in the pillar base portion 21a and the pillar portion 22, and two second tethers 24 are arranged at the main body portion 21. As shown in FIG. 2C, each second tether 24 has openings 25 through which the gas flows from the inflators 10, 10 (see FIG. 2A).

A vent hole VH is formed in the distal end of each pillar portion 22 so as to absorb an impact energy upon collision of the collision object. The gas is discharged from the vent hole VH upon collision of the collision object so that the impact applied to the collision object can be relieved.

Description will be given to the manner of folding and accommodating the air bag 20.

Figure 3A:
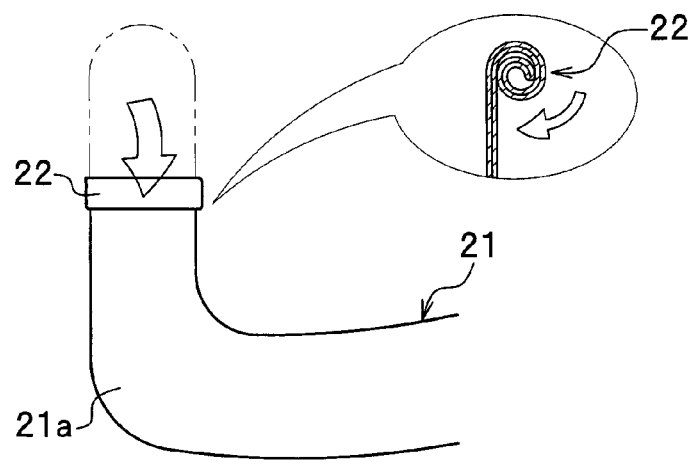
Figure 3B:
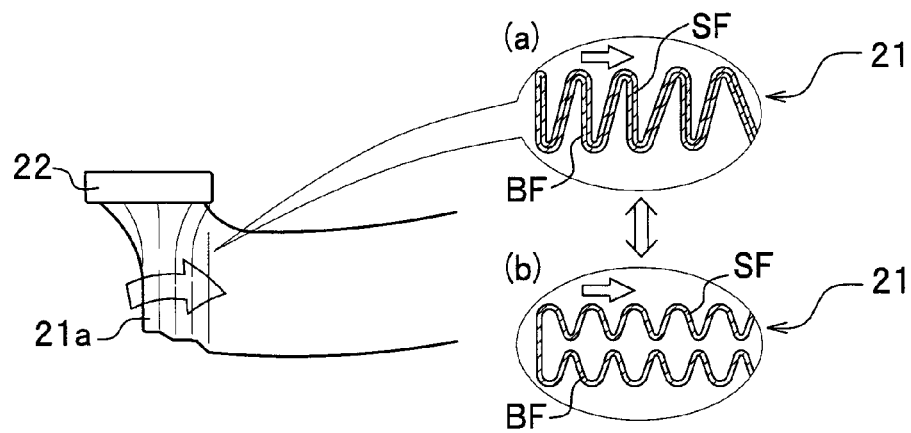

As shown in FIG. 3A, each pillar portion 22 is rolled up to form an involute roll from the distal end thereof in a direction remote from the vehicle 2 (see FIG. 1A) and with the distal end as the center of the roll. Rolling up the pillar portion 22 in this manner makes it possible to expand the pillar portion 22 at a certain constant rate. Further, rolling up the pillar portion 22 to form an involute roll makes it possible to expand the pillar portion 22 while pressing the pillar portion 22 against the vehicle 2. This advantageously prevents the pillar portions 22, 22 from rising up from the vehicle body, and further restricts a flow of the gas into the pillar portions 22, 22 during expansion of the main body portion 21. Next, as shown in FIG. 3B, each pillar base portion 21a is folded up in the horizontal direction in a bellows fashion. Thereafter, as shown in FIG. 3C, these folded-up parts in the shape of bellows are fixed by tape T that is easily cut.

"Folding up in a bellows fashion" indicates that the front surface SF and the reverse surface BF of the pillar base portion 21a are superposed on each other and they are alternately folded back together into corrugated shape as illustrated in (a) of FIG. 3B as well as that the front surface SF and the reverse surface BF of the pillar base portion 21a are not superposed and each of these surfaces is separately and alternately folded back into corrugated shape as illustrated in (b) of FIG. 3B. Folding up in this manner (bellows) makes it possible to quickly transmit the gas and also to expand the bellows straight in a predetermined direction.

Figure 3C:
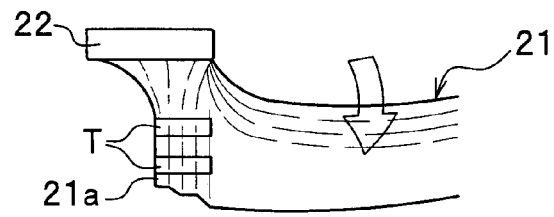
Figure 3D:
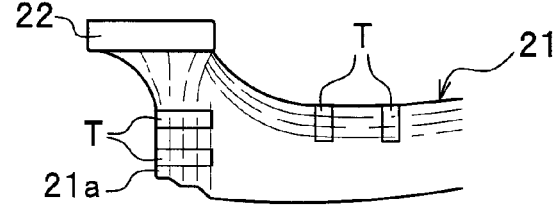
Figure 3E:
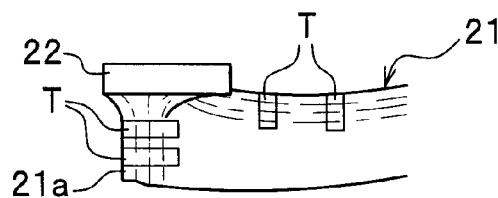
Figure 4A:
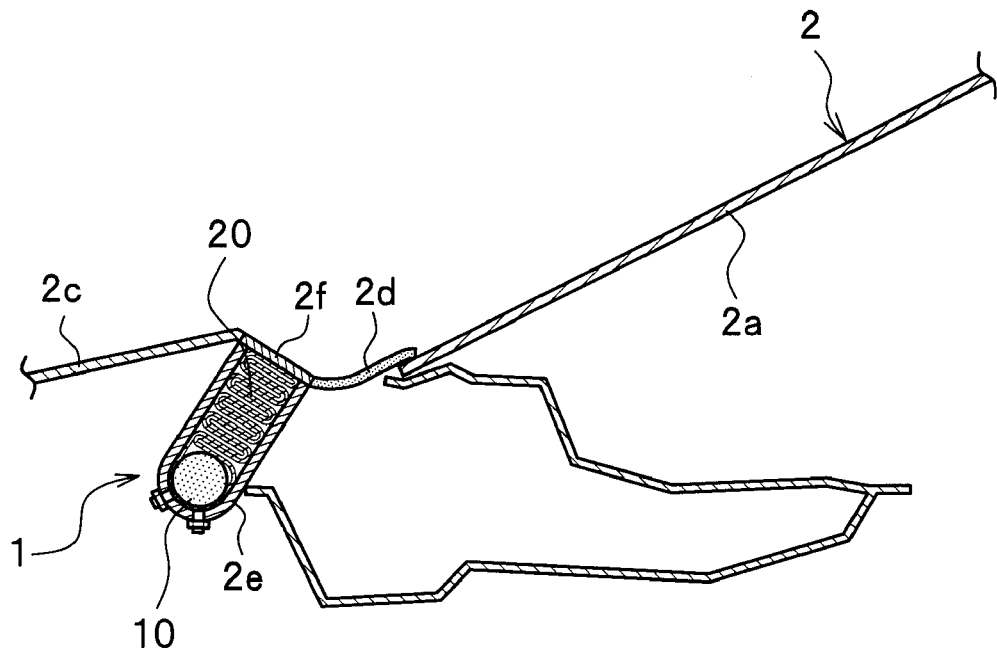
FIG. 4A is a sectional view taken along the line A-A of FIG. 1A, illustrating the air bag not having been inflated and expanded.

Next, as shown in FIG. 3C, the main body portion 21 is folded up in a bellows fashion in the vertical direction only at an upper part thereof. This folded up part is fixed by tape that is easily cut as illustrated in FIG. 3D. Finally, as shown in FIG. 3E, each pillar base portion 21a is folded and moved to the center. As seen in FIG. 1A, the air bag 20 is thus positioned around the center and accommodated under the cowl top 2d which is arranged below the front windshield glass 2a. To be more specific, as shown in FIG. 4A, the air bag 20 is accommodated in a retainer 2e which is arranged below the rear end of a hood 2c. The retainer 2e has an opening which is closed by a lid member 2f after the air bag 20 is accommodated in the retainer 2e. The lid member 2f forms a continuous surface with the cowl top 2d.

Operation and effects of the collision object protection device 1 will be described below.

Figure 4B:
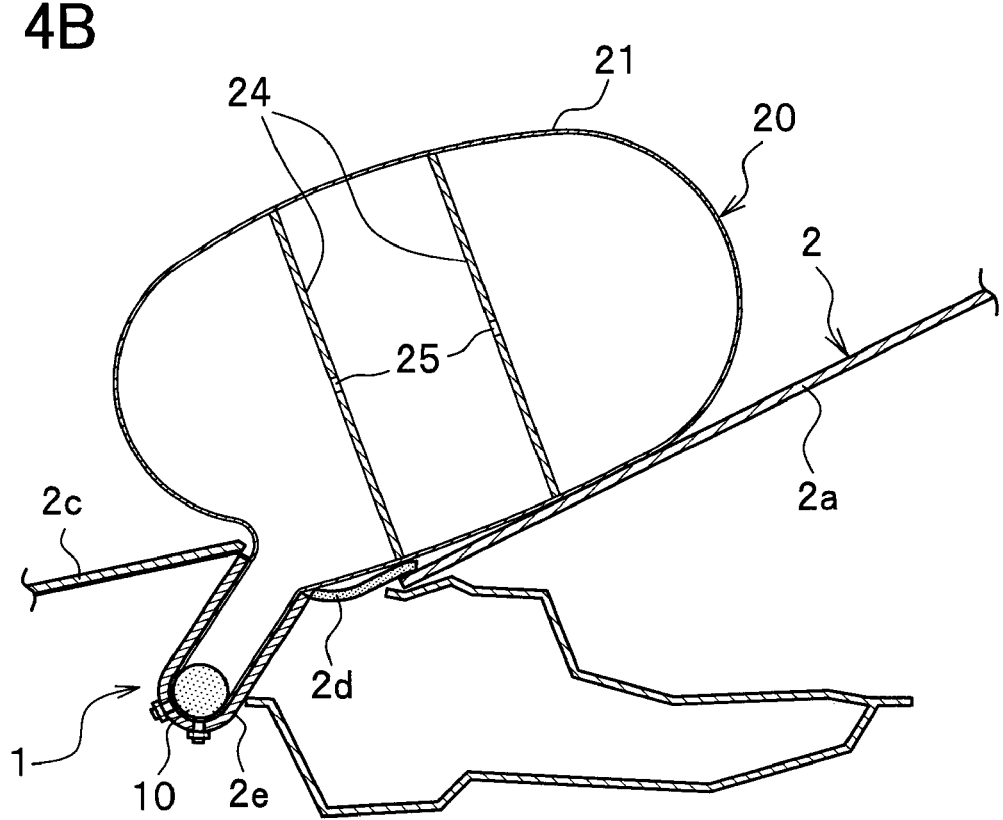
FIG. 4B is a sectional view taken along the line B-B of FIG. 1B, illustrating the air bag having been inflated and expanded.
Figure 5A:
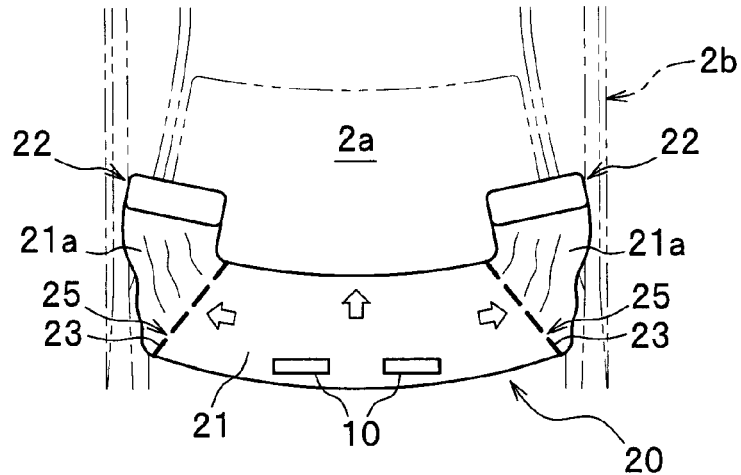
FIG. 5A is a top plan view explaining the movement of the air bag until the expansion of the main body portion is completed.

As shown in FIG. 5A, as soon as the collision object protection device 1 detects or predicts a collision of the vehicle 2 with a collision object such as a pedestrian, the collision object protection device 1 operates the inflators 10, 10 to inflate and expand the main body portion 21 of the air bag 20. Providing the second tethers 24 inside the main body portion 21 (see FIG. 4B) makes it possible to retain the main body portion 21 for the predetermined shape after the expansion of the main body portion 21. Further, a flow of the gas is allowed through the openings 25 formed in each second tether 24.

Figure 5B:
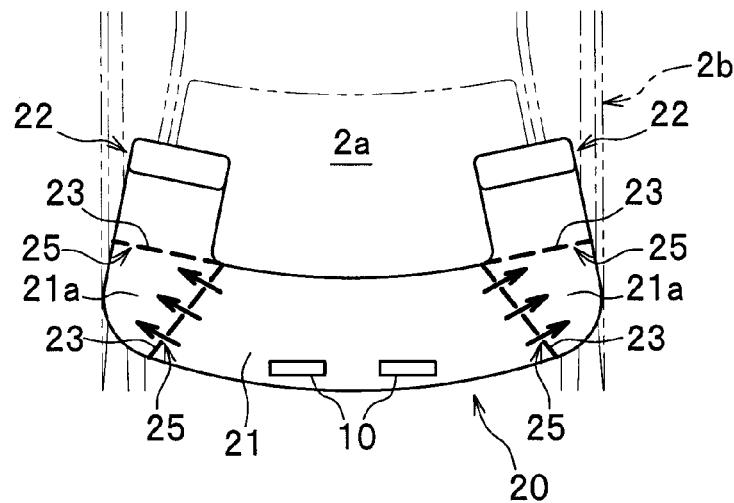
FIG. 5B is a top plan view explaining the movement of the air bag when the pillar base portions are inflated and expanded.
Figure 5C:
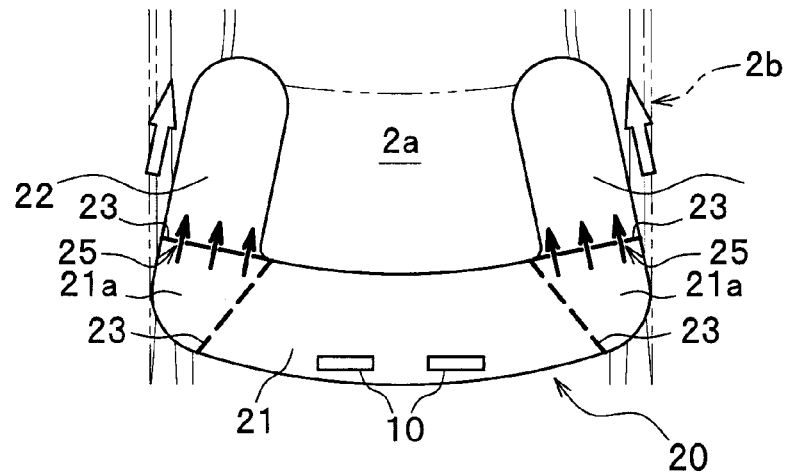
FIG. 5C is a top plan view explaining the movement of the air bag when the pillar portions are inflated and expanded.

As shown in FIG. 5A, the main body portion 21 expands along the lower part of the front windshield glass 2a. During this time, the flow of the gas from the main body portion 21 to each pillar base portion 21a is allowed only through the openings 25 formed in the first tethers 23 that is arranged respectively at the boundaries between the main body portion 21 and the pillar base portion 21a, as illustrated in FIG. 5B. For this reason, the expansion of the pillar base portions 21a, 21a follows after the expansion of the main body portion 21. That is, the timing of the expansion at the pillar base portions 21a, 21a is delayed relative to expansion at the main body portion 21. Moreover, as shown in FIG. 5C, the flow of the gas from each pillar base portion 21a to the corresponding pillar portion 22 is allowed only through the openings 25 formed in the first tether 23 that is arranged at the boundary between the pillar base portion 21a and the pillar portion 22. For this reason, the expansion of the pillar portions 22, 22 follows after the expansion of the pillar base portions 21a, 21a. That is, the timing of the expansion at the pillar portions 22, 22 is delayed relative to expansion at the pillar base portions 21a, 21a.

In this collision object protection device 1, the pillar base portions 21a, 21a expand after the main body portion 21 expands to have a sufficient rigidity (stiffness), and the pillar portions 22, 22 expand after the pillar base portions 21a, 21a expand to have a sufficient rigidity (stiffness).

According to this collision object protection device 1, since the pillar portions 22, 22 expand after the main body portion 21 and the pillar base portions 21a, 21a have a sufficient rigidity, it is possible to prevent flapping of the pillar portions 22, 22 during the expansion of the air bag 20.

According to this collision object protection device 1, the pillar base portions 21a, 21a expand after the main body portion 21 expands to have a sufficient rigidity (stiffness), and so leaping of the pillar base portions 21a, 21a from the lower part of the front windshield glass 2a can be prevented. As a result, it is possible to prevent the pillar portions 22, 22 from rising up from the vehicle 2 during the expansion of the pillar portions 22, 22, which can prevent the air bag 20 from being disadvantageously moved off from the predetermined position due to a crosswind or the like. Therefore, according to the collision object protection device 1, the inflated and expanded air bag 20 can stably cover the intended protection area.

According to this collision object protection device 1, since the pillar base portions 21a, 21a are folded up in the horizontal direction in a bellows fashion, the pillar base portions 21, 21a can quickly expand to quickly stabilize the main body portion 21.

Further, according to this collision object protection device 1, by adjusting the size of the diameter and/or the number of openings 25 formed in the first tether 23, it is possible to control the expansion speeds of the main body portion 21, the pillar base portions 21a, 21a, and the pillar portions 22, 22.

Further, according to this collision object protection device 1, the main body portion 21 is folded up in a bellows fashion in the vertical direction. Therefore, even if the width (distance in the vertical direction) of the main body portion 21 is wide, the main body portion 21 can be quickly inflated and expanded.

Further, according to this collision object protection device 1, since each pillar portion 22 is rolled up to make a roll, the pillar portion 22 can be expanded at a certain constant rate.

Second Embodiment

Figure 6A:
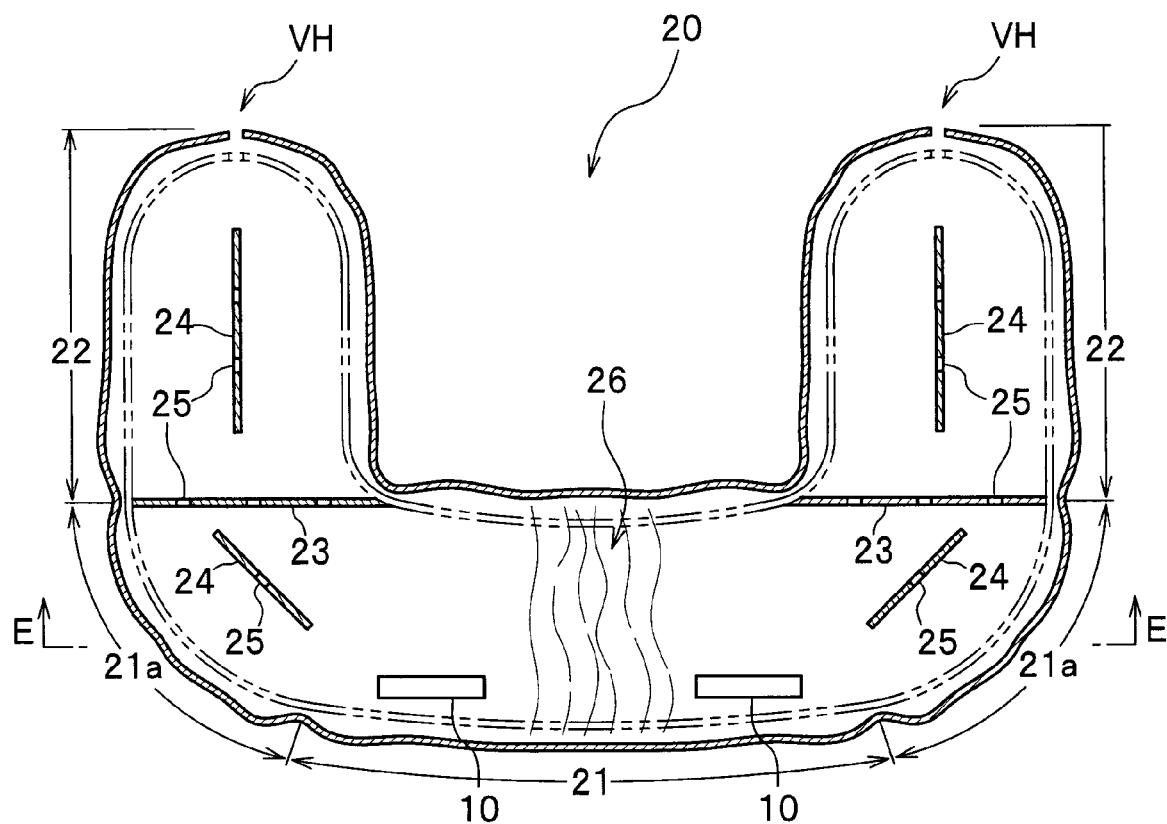
FIG. 6A is a schematic view showing an air bag of a collision object protection device according to a second embodiment of the present invention, showing the inside of the air bag.
Figure 6B:
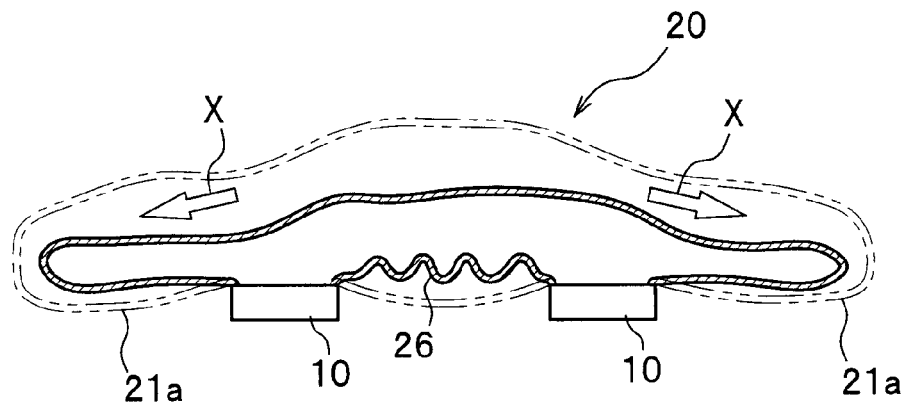
FIG. 6B is a sectional view taken along the line E-E of FIG. 6A.

With reference to FIGS. 6A and 6B, a collision object protection device according to a second embodiment of the present invention will be described below. In FIGS. 6A and 6B, the air bag that has not been inflated and expanded is indicated by solid line, and the air bag that has been inflated and expanded is indicated (except the first and second tethers) by two-dot chain line. The collision object protection device according to the second embodiment is substantially the same as the collision object protection device according to the first embodiment except for the configuration of the air bag 20, and therefore description will be given only to the air bag 20. In the drawings, parts similar to those previously described with reference to the first embodiment are denoted by the same reference numerals, and detailed description thereof will be omitted.

As shown in FIG. 6A, a first tether 23 is arranged inside the air bag 20 respectively at boundaries between the pillar base portions 21a, 21a and the pillar portions 22, 22. Further, a second tether 24 is arranged respectively at the pillar base portions 21a, 21a and at the pillar portions 22, 22.

As seen in FIG. 6B, the main body portion 21 of the air bag 20 is fixed to the vehicle 2 (see FIG. 1B) by attaching the main body portion 21 to the inflators 10, 10 such that a portion of the air bag 20 that is sandwiched between the two inflators 10, 10 is provided with a gather 26.

According to this air bag 20, as shown in FIG. 6B, since the air bag 20 is provided with a gather 26 at a portion sandwiched between the two inflators 10, 10, when the gas is supplied from the inflators 10, 10, the air bag 20 expands in the upward and downward directions at positions between the two inflators 10, 10 in accordance with the gather and accumulates pressure. Therefore, from the portion at which the air bag expands in the upward direction flows the gas to each pillar base portion 21a in the diagonally downward direction X. This flow of the gas urges the pillar base portion 21a in the downward direction. Further, as shown in FIG. 6A, since the first tether 23 having openings 25 is arranged inside the air bag 20 respectively at boundaries between the pillar base portions 21a, 21a and the pillar portions 22, 22, the timing of the expansion at the pillar portions 22, 22 is delayed more than at the main body portion 21 and the pillar base portions 21a, 21a. Therefore, the pillar portions 22, 22 expand after the main body portion 21 and the pillar base portions 21a, 21a expand to have a sufficient rigidity (stiffness).

According to the collision object protection device 1 equipped with this air bag 20, the pillar portions 22, 22 expand after the main body portion 21 and the pillar base portions 21a, 21a expand to have a sufficient rigidity (stiffness), which can prevent flapping of the pillar portions 22 during the expansion of the air bag 20.

Further, according to the collision object protection device 1 equipped with this air bag 20, the pillar base portions 21a, 21a can be urged downwardly because of the flow of the gas directed to the diagonally downward direction X, which can prevent the pillar base portions 21a, 21a from leaping from the lower part of the front windshield glass 2a. As a result, it is possible to prevent the pillar portions 22, 22 from rising up from the vehicle 2 during the expansion of the air bag 20, which can prevent the air bag 20 from being disadvantageously moved off from the predetermined position due to a crosswind or the like.

Further, according to the collision object protection device 1 equipped with this air bag 20, as shown in FIG. 6B, the main body portion 21 expands in the upward and downward directions during the expansion of the air bag 20 so that the flatness of the air bag surface can be ensured over a wide range of area. This can reliably prevent the air bag 20 from being disadvantageously moved off from the predetermined position. Therefore, according to this collision object protection device 1, the inflated and expanded air bag 20 can stably cover the intended protection area in a more reliable manner.

Further, according to this collision object protection device 1, adjusting the extent of the gather 26 enables to adjust the degree of the expansion of the main body portion 21 in the upward and downward directions. Therefore, it is possible to control the urging force by which the pillar base portions 21a, 21a are urged in the downward direction.

Further, according to the collision object protection device 1 equipped with this air bag 20, it is not necessary to arrange the second tethers 24, 24 at the position where the air bag 20 is provided with the gather 26, and so the number of parts for the air bag 20 can be decreased.

Third Embodiment

Figure 7:
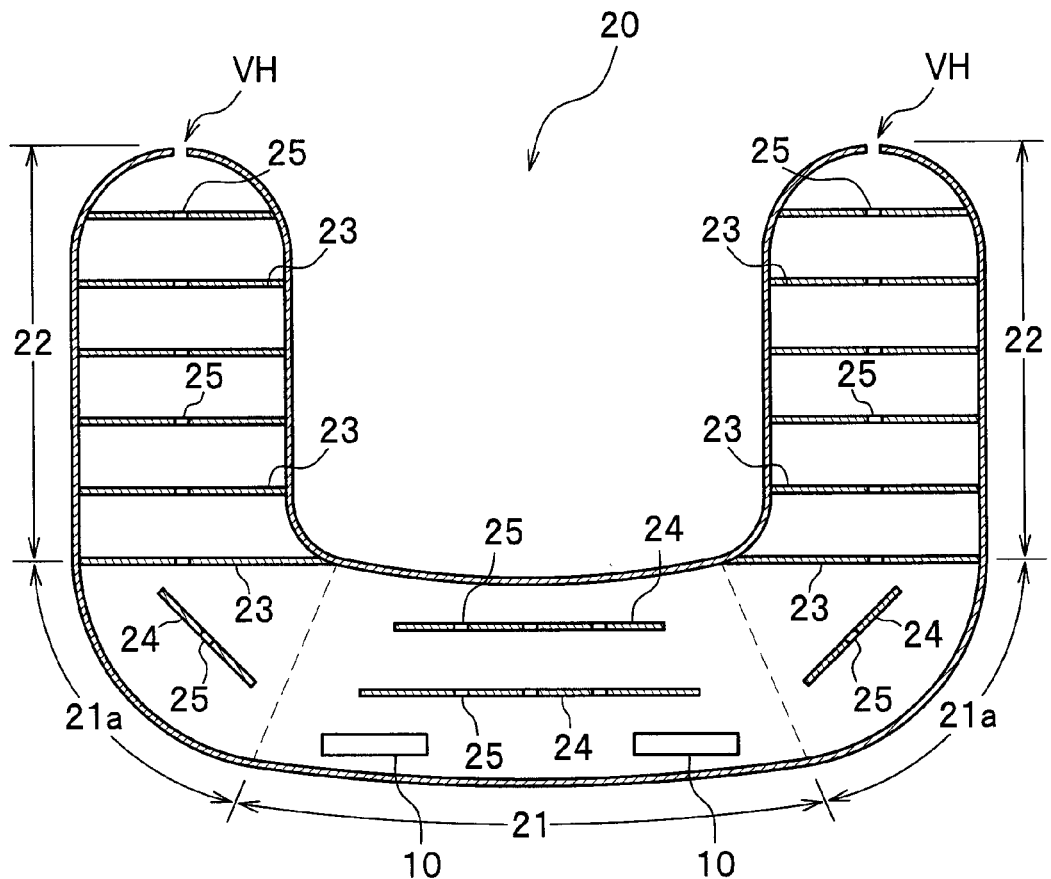
FIG. 7 is a schematic view showing an air bag of a collision object protection device according to a third embodiment of the present invention, showing the inside of the air bag.

With reference to FIG. 7, a collision object protection device according to a third embodiment of the present invention will be described below. The collision object protection device according to the third embodiment is substantially the same as the collision object protection device according to the first embodiment except for the configuration of the air bag 20, and therefore description will be given only to the air bag 20. Parts similar to those previously described with reference to the first embodiment are denoted by the same reference numerals, and detailed description thereof will be omitted.

As shown in FIG. 7, a first tether 23 is arranged inside the air bag 20 respectively at boundaries between the pillar base portions 21a, 21a and the pillar portions 22, 22. Further, a plurality of first tethers 23 are arranged inside the air bag 20 respectively across the pillar portions 22. The plurality of first tethers 23 are spaced apart from each other in an area where each pillar portion 22 extends.

According to this air bag 20, the first tether 23 having an opening 25 is arranged respectively at boundaries between the pillar base portions 21a, 21a and the pillar portions 22, 22, and so the timing of the expansion delays at the pillar portions 22, 22 than at the main body portion 21 and the pillar base portions 21a, 21a. Therefore, the pillar portions 22, 22 expand after the main body portion 21 and the pillar base portions 21a, 21a expand to have a sufficient rigidity (stiffness). Moreover, since a plurality of first tethers 23 are arranged in an area where the pillar portion 22 extends during the expansion of the air bag 20, the timing of the expansion delays gradually from the pillar base portion 21a to distal end of the pillar portion 22. In other words, the air bag 20 expands gradually from the pillar base portions 21a, 21a toward the distal ends of the pillar portions 22, 22 and in the order from one area divided by the adjacent two first tethers 23, 23 after another.

According to the collision object protection device 1 equipped with this air bag 20, the pillar portions 22, 22 expand after the main body portion 21 and the pillar base portions 21a, 21a expand to have a sufficient rigidity (stiffness). Therefore, it is possible to prevent flapping of the pillar portions 22, 22 during the expansion of the air bag 20.

Further, according to the collision object protection device 1 equipped with this air bag 20, since each pillar portion 22 gradually and in the order expands from the proximal end to the distal end, it is possible to reliably prevent flapping of the pillar portions 22, 22 during the expansion of the air bag 20. Therefore, according to the collision object protection device 1, the inflated and expanded air bag 20 can stably cover the intended protection area in a more reliable manner.

Further, according to this collision object protection device 1, by adjusting the number of first tethers 23 arranged at each pillar portion 22, and the size of the diameter and/or the number of openings 25, it is possible to control the expansion speed of the pillar portion 22.

While the present invention has been described with reference to first to third embodiments thereof, it is to be understood that the present invention is not limited to these specific embodiments and various changes and modifications may be made without departing from the scope of the invention.

Figure 8:
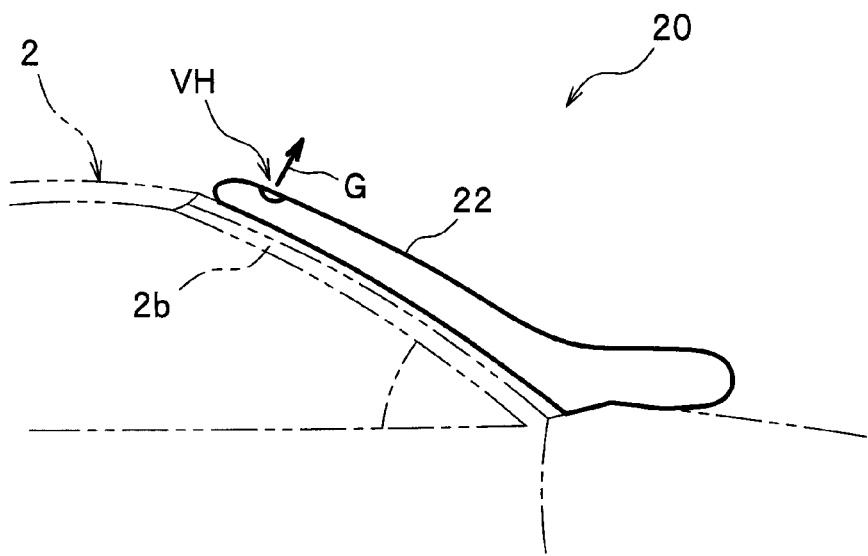
FIG. 8 is a schematic view showing an air bag of a collision object protection device according to other embodiment, viewing from the side of the air bag that has been inflated and expanded.

According to the present invention, vent holes VH of the air bag 20 (see FIG. 2A, etc.) may be provided in the air bag 20 at positions shown in FIG. 8.

As seen in FIG. 8, a vent hole VH of the air bag 20 is formed outward in the opposite side of the vehicle 2. The vent hole VH is provided respectively at the distal ends of the pillar portions 22, 22.

According to the collision object protection device 1 equipped with this air bag 20, when the inflated and expanded air bag 20 discharges the gas from the vent holes VH in the direction opposite to the vehicle 2, the flows of the gas G urge the pillar portions 22, 22 downward against the front pillars 2b, 2b.

According to the collision object protection device 1 equipped with this air bag 20, since flapping of the pillar portions 22, 22 can be prevented in a reliable manner, the inflated and expanded air bag 20 can stably cover the intended protection area.

According to the present invention, a first tether 23 may be provided in the air bag 20 according to the second embodiment (see FIG. 6A) respectively at boundaries between the main body portion 21 and the pillar base portions 21a, 21a. Namely, the collision object protection device 1 may have an air bag which is configured by the combination of the air bags 20 according to the first embodiment and the second embodiment. According to this collision object protection device 1, the number of second tethers 24 can be decreased and further flapping and rising up of the pillar portions 22, 22 can be reliably prevented during the expansion of the air bag 20.

Further, according to the present invention, in place of the second tether 24 arranged at each pillar portion 22 in the air bag 20 according to the second embodiment (see FIG. 6A), a plurality of first tethers 23 may be provided as with the pillar portion 22 in the air bag 20 according to the third embodiment (see FIG. 7). According to this collision object protection device 1, the number of second tethers 24 can be decreased and further flapping and rising up of the pillar portions 22, 22 can be reliably prevented during the expansion of the air bag 20.

Moreover, according to the present invention, a first tether 23 may be provided in the air bag 20 according to the third embodiment (see FIG. 7) respectively at boundaries between the main body portion 21 and the pillar base portions 21a, 21a. Namely, the collision object protection device 1 may have an air bag which is configured by the combination of the air bag 20 according to the third embodiment and the first embodiment. According to this collision object protection device 1, flapping and rising up of the pillar portions 22, 22 can be reliably prevented during the expansion of the air bag 20.

According to the first through third embodiments, the first tether 23 (second tether 24) has one ore more openings 25 so that a flow of the gas is permitted through the first tether 23 (second tether 24). However, the present invention is not limited to this specific embodiment. For example, the inner wall of the air bag 20 and the first tether 23 (second tether 24) may be partly unjoined to permit a flow of the gas. In the case of the first tether 23, a gas-flowing portion may be provided, for instance, by not joining (sewing) both ends of the first tether 23.

What is claimed is:

1. A collision object protection device, which inflates and expands an air bag on a vehicle as soon as a collision of a collision object with the vehicle is detected or predicted, the collision object protection device comprising:

the air bag consisting of a main body portion which expands along a lower part of a front windshield glass of the vehicle, a pair of pillar portions which expand along front pillars of the vehicle, and a pair of pillar base portions which connect the main body portion and the pair of pillar portions; and a pair of inflators to which the main body portion of the air bag is attached to supply a gas to the main body portion, wherein the main body portion is provided with a gather between the inflators.

2. A collision object protection device according to claim 1, wherein a partition wall having one or more openings is arranged inside the air bag respectively at boundaries between the pillar base portions and the pillar portions.

3. A collision object protection device according to claim 2, wherein a vent hole for discharging the gas is provided at each pillar portion in such a position that the gas is discharged oppositely to the vehicle.

4. A collision object protection device according to claim 1, wherein a vent hole for discharging the gas is provided at each pillar portion in such a position that the gas is discharged oppositely to the vehicle.

* * * * *